Figure 1:
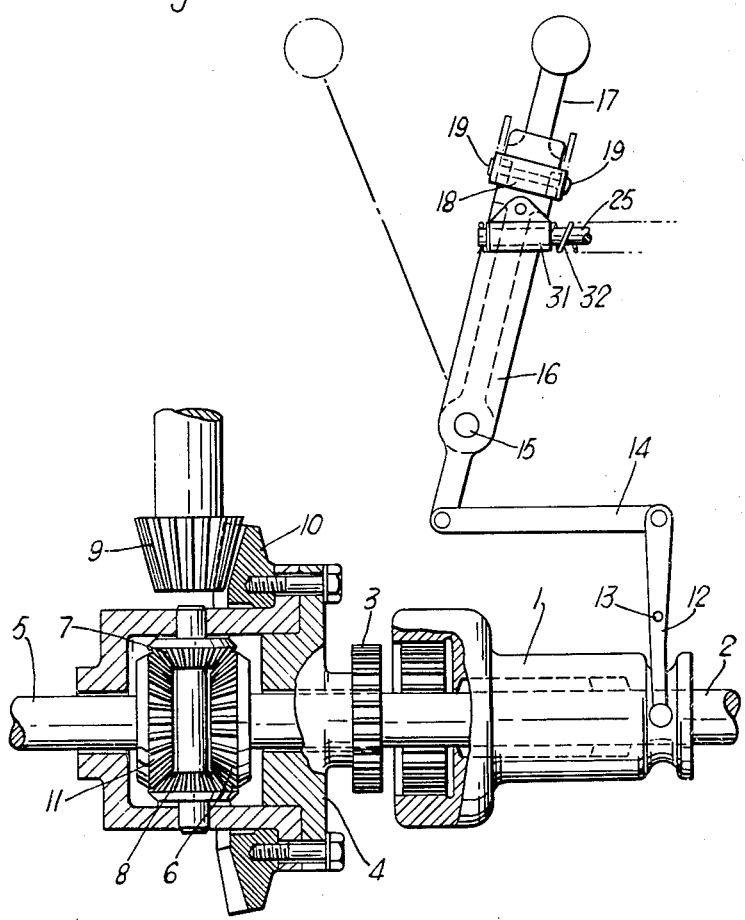

Nov. 2, 1965  A. SENKOWSKI ETAL  3,215,000
CONTROL MECHANISM FOR TRACTORS
Filed Feb. 14, 1963  3 Sheets-Sheet 1

Inventors
ALEXANDER SENKOWSKI
FRANK M. INNS

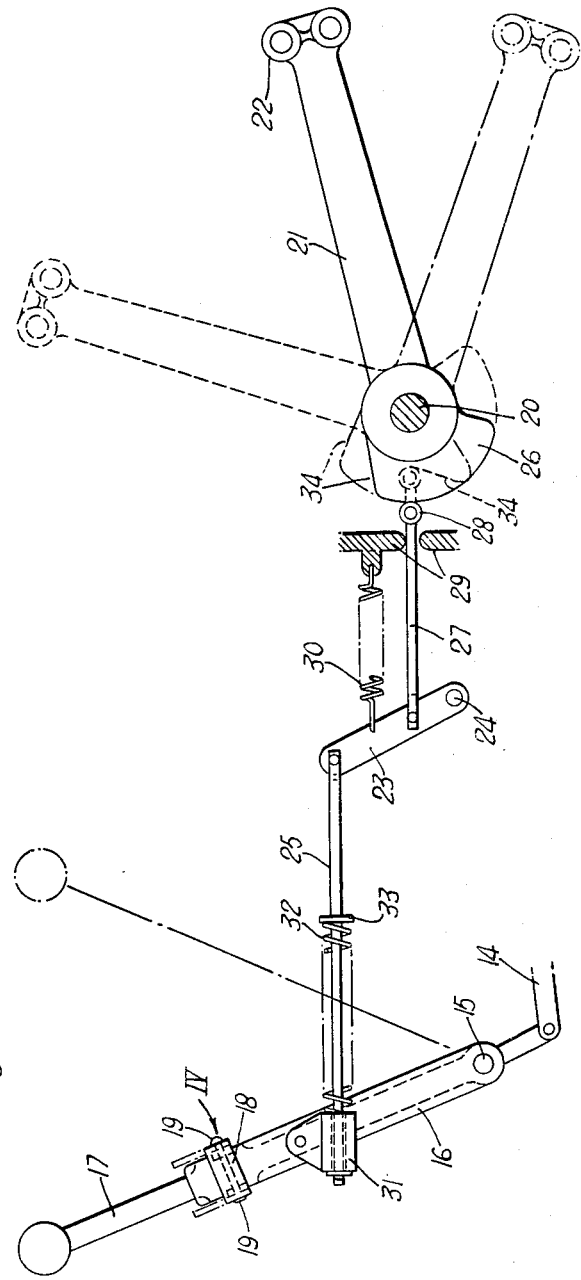

Nov. 2, 1965   A. SENKOWSKI ETAL   3,215,000
CONTROL MECHANISM FOR TRACTORS
Filed Feb. 14, 1963   3 Sheets-Sheet 3
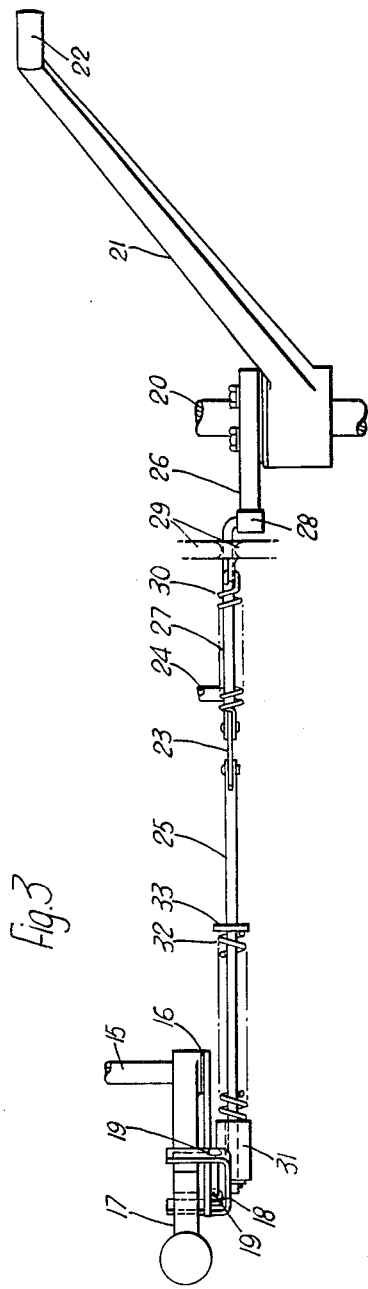
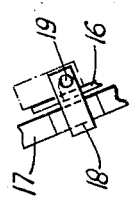
Inventors
ALEXANDER SENKOWSKI
FRANK M. INNS
By Imirie + Smiley
Attorneys

United States Patent Office 3,215,000
Patented Nov. 2, 1965

3,215,000
CONTROL MECHANISM FOR TRACTORS
Alexander Senkowski, Earlsdon, Coventry, and Frank Markham Inns, Balsall Common, England, assignors to Tractor Research Limited, Abbotswood, England, a company of Great Britain
Filed Feb. 14, 1963, Ser. No. 258,563
Claims priority, application Great Britain, Feb. 27, 1962, 7,672/62
12 Claims. (Cl. 74—710.5)

This invention relates to control mechanism for tractors and in particular to control mechanism for controlling the operation of a locking device co-operating with a differential gear coupling half-shafts with which the rear wheels of a tractor are respectively rotatable.

Many tractors are fitted with differential locking devices for the purpose above mentioned because such devices are of value in field working condition when one rear driving wheel has less adhesion than the other. Many of the devices so employed are controlled by a foot pedal but some have a hand-control for engaging and disengaging the devices.

It is a main object of the present invention to relieve the tractor driver of the necessity of having to operate the differential locking device during most of the time when the working conditions render the use of the device advantageous.

When a tractor is fitted with an implement to be drawn thereby the differential locking device may need to be engaged when the implement is in the lowered, or working, position thereof and when the implement is raised from the working position the differential locking device must be disengaged to facilitate turning of the tractor. By the present invention it is proposed automatically to effect engagement and disengagement of the locking device as a function of the lowering and lifting of the implement.

According to the invention there is provided mechanism for controlling the operation of a locking device co-operating with a differential gear coupling half-shafts with which the rear wheels of a tractor are respectively rotatable, wherein a control lever is connected with the locking device and a coupling device couples the control lever with a rock shaft carrying for rotation therewith a lift arm connectable to an implement to be drawn by the tractor, the coupling device being operable by the rock shaft to effect operation of the control lever as a function of the rocking movements of the rock shaft.

According to another aspect of the invention there is provided mechanism for controlling the operation of a locking device co-operating with a differential gear coupling half-shafts with which the rear wheels of a tractor are respectively rotatable, comprising a control lever connectable to the locking device and rotatable about a fixed axis between a disengaged position thereof in which the locking device is inoperative and an engaged position in which the locking device is operative to effect locking of the differential gear, a rock shaft supportable for rocking movement about the longitudinal axis thereof, a lift arm secured to the rock shaft for angular movement therewith and connectable with an implement to be drawn by the tractor, and a coupling device which connects the rock shaft with the control lever and is operable on rotation of the rock shaft to move the control level to the engaged position thereof on movement of the lift arm to the working position of an implement carried thereby and to the disengaged position thereof on rocking of the rock shaft to raise the lift arm away from the working position of an implement carried thereby.

In one embodiment of the invention the coupling device comprises a transfer lever rockable about an axis located between the rock shaft and control lever, a transfer link connecting the transfer lever to the control lever, a cam secured to the rock shaft for rocking movement therewith, an actuating member connected with the transfer lever and co-operating with said cam for lengthwise movement thereby, and a spring acting to urge the actuating member towards the cam.

The transfer link may be movable lengthwise relative to the rocking lever in a bearing carried by the control lever and a spring extend between said bearing and an abutment on the transfer link to maintain the operative connection between the link and control lever and to permit lengthwise movement of the link relative thereto against the action of the spring in the event that the locking device is not in a condition immediately to lock or to unlock the differential gear.

The control lever may comprise a control arm freely mounted on a control shaft, a hand-operable lever secured to the control shaft to effect rocking thereof, and a connecting element operable selectively to couple the control arm to the hand operable lever or to disconnect the hand-operable lever from the control arm.

In order that the invention may be clearly understood one embodiment thereof will now be described, by way of example, with reference to the accompanying drawings, in which:

FIGURE 1 is a view, partly in section, of one form of locking device to be controlled by mechanism according to the invention, FIGURE 2 is an elevation of control mechanism according to the invention, FIGURE 3 is a top plan view of FIGURE 2, and FIGURE 4 is a view of a detail looking in the direction of arrow IV, FIGURE 2.

Referring to the drawings, FIGURE 1 illustrates one known form of locking device controllable by mechanism according to the invention. The locking device comprises a locking collar 1 splined to one half-shaft 2 for axial movement relative thereto, and an externally toothed locking member 3 rotatable with the cage 4 of the differential gear coupling the half-shaft 2 to the other half-shaft 5. The collar 1 is provided with internal teeth for meshing engagement with the external teeth of member 3 and the rear wheels, not shown, of the tractor are respectively rotatable with the half-shafts 2, 5.

As shown in FIGURE 1 the locking device is in the disengaged condition thereof but on movement of the collar 1 to the left as viewed in FIGURE 1 the internal teeth of collar 1 mesh with the external teeth of the member 3 and in this, the engaged, condition of the locking device the cage 4 is locked relative to the bevel gear 6 which is rotatable with the half-shaft 2 and so prevents rotation of the planet bevel pinions 7, 8 about the axes thereof. Rotation of the cage 4, by pinion 9 and the crown gear 10 secured to cage 4, causes the bevel gears 6 and 11 to rotate in the same sense and at the same speed. The locking device is disengaged by movement of the collar 1 to the right as viewed in FIGURE 1.

Axial movements of the collar 1 are effected by a fork 12 pivoted at 13 to the tractor frame, not shown, and connected to one end of a link 14, the opposite end of which is connected to a control lever rockable with a control shaft 15 journalled in the tractor frame.

As shown in the drawings the control lever is an assembly comprising a control arm 16 freely mounted on the control shaft 15, a hand-operable lever 17 secured to the control shaft 15 to effect rocking thereof, and a connecting element 18 which is operable selectively to couple the control arm 16 to the lever 17 or to disconnect the lever 17 from arm 16. The connecting element 18 is a clip which is pivoted at 19 to the control arm 16 and which when pivoted towards lever 17 clips the arm 16 to the lever 17.

The control lever, through control arm 16, is connected by a coupling device with a rock shaft 20, FIGURES 2 and 3, which carries for rotation therewith a lift arm 21 the outer end 22 of which is arranged for connection to an implement, not shown, to be drawn by the tractor. The rock shaft 20 is journalled in the frame of the tractor for rocking movement, in known manner by mechanism not shown, to lower an implement carried by arm 21 to the working position of the implement or to raise the implement from the working position thereof. The coupling device, as will be described below, effects operation of the control lever automatically as a function of the rocking movements of the rock shaft 20.

The coupling device comprises a transfer lever 23 rockable about the axis of a shaft 24. The shaft 24 is rockable in bearings, not shown, carried by the tractor and the axis of shaft 24 is located between the rock shaft 20 and the control lever. A transfer link, shown as a rod 25, connects the transfer lever 23 to the control arm 16. A cam 26 is secured to the rock shaft 20 for rocking movement therewith and an actuating member shown as a rod 27 is connected with the transfer lever 23 and carries a roller 28 for co-operation with the cam 26. The actuating rod is slidable lengthwise in bearings or guides 29 and is urged by a spring 30 towards the cam 26.

The transfer link 25 is movable lengthwise relative to the control arm 16 in a bearing 31 carried by the control arm 16 and a spring 32 extends between the bearing 31 and an abutment 33 on the link 25 to maintain operative connection between the link 25 and the control arm 16 and to permit lengthwise movement of the link 25 relative to the arm 16 in the event that the locking collar 1 is not immediately engageable with or disengageable from the toothed locking member 3.

When the locking device 1, 3 is to be automatically controlled the clip 18 connects the arm 16 and the hand-operable lever 17 for simultaneous rocking with control shaft 15 and when the locking device is to be controlled manually the clip is disengaged from the lever 17 so that the cam 26 is rendered ineffective and operation of the locking device 1, 3 is controllable solely by manual manipulation of the lever 17.

In FIGURE 2 the lift arm 21 is shown in an intermediate position thereof but as the cam is concentric with the axis of shaft 20 the locking device 1, 3 is in the engaged condition thereof.

When the implement is in the working position thereof the lift arm is in the position illustrated by dot and dash lines, FIGURE 2, and the locking device 1, 3 is engaged. Preparatory to turning the tractor the implement is raised, by rotation of lift arm 21, counter-clockwise as viewed in FIGURE 2, to the raised position thereof illustrated in dotted lines and rotation of cam 26 causes the flat portion 34 of the cam to be presented to roller 28 so that the actuating rod 27 is moved by spring 30 to the right as viewed in FIGURE 2, and the locking device 1, 3 is disengaged.

On again lowering the implement to the working position the cam 26 moves the actuating rod 27 to the left, as viewed in FIGURE 2, thus re-engaging the locking device 1, 3.

If when the lift arm 21 is raised the torque transmitted through the locking member 3 is held so that it is not possible to disengage the locking collar 1 therefrom the mechanism is not overstrained because the spring 30 can exert only a limited pull on the transfer link 25. The spring 30 will, however, effect movement of the collar 1 to the disengaged position as soon as the torque pressure is relieved, as by a light tap on one of the independent brake pedals, not shown, of the tractor, a slight swing of the tractor steering, or by de-clutching of the engine.

Similarly, if when the lift arm is lowered the collar 1 is not quite aligned with member 3, the spring 32 will be compressed by lengthwise movement of the transfer link 25 relative to the control arm 16 and the spring 32 will cause engagement of the collar 1 with member 3 as soon as alignment is effected.

The hand-operated lever 17 will be disconnected from control arm 16 and used manually only on rare occasions when the locking device 1, 3 is required and no implement is mounted on the lift arm 21.

We claim:

1. In a tractor having a differential gear coupling half-shafts with which the rear wheels of the tractor are respectively rotatable, a locking device supported for movement into and out of locking engagement with the differential gear, and a rock shaft having a lift arm rotatable therewith and connectable to an implement to be drawn by the tractor, mechanism for controlling operation of the locking device comprising a control lever connected with the locking device to effect movement thereof into and out of locking engagement with the differential gear, and a coupling device which couples said control lever and rock shaft and is operable by the rock shaft to effect operation of the control lever as a function of the rocking movements of the rock shaft.

2. Mechanism according to claim 1, wherein the coupling device comprises a transfer lever rockable about an axis located between the rock shaft and control lever, a transfer link connecting the transfer lever to the control lever, a cam secured to the rock shaft for rocking movement therewith, an actuating member connected with the transfer lever and co-operating with said cam for lengthwise movement thereby, and a spring acting to urge the actuating member towards the cam.

3. Mechanism according to claim 2, including a bearing carried by the control lever and by which the transfer link is supported for movement lengthwise relative to the control lever, an abutment on the transfer link, and a spring extending between said bearing and abutment to maintain the operative connection between the link and control lever and to permit lengthwise movement of the link relative to the control lever against the action of the spring in the event that the locking device is not in a condition immediately to lock or unlock the differential gear.

4. Mechanism according to claim 2, wherein the control lever comprises a control arm freely mounted on a control shaft, a hand-operable lever secured to the control shaft to effect rocking thereof, and a connecting element operable selectively to couple the control arm to the hand operable lever or to disconnect the hand-operable lever from the control arm.

5. Mechanism according to claim 4, wherein the connecting element comprises a clip pivotally mounted on the control arm.

6. Mechanism according to claim 4, including a bearing carried by the control lever and by which the transfer link is supported for movement lengthwise relative to the control lever, an abutment on the transfer link, and a spring extending between said bearing and abutment to maintain the operative connection between the link and control lever and to permit lengthwise movement of the link relative to the control lever against the action of the spring in the event that the locking device is not in a condition immediately to lock or unlock the differential gear.

7. In a tractor having a differential gear coupling half-shafts with which the rear wheels of the tractor are respectively rotatable, a locking device supported for movement into and out of locking engagement with the differential gear, and a rock shaft having a lift arm rotatable therewith and connectable to an implement to be drawn by the tractor, mechanism for controlling the operation of the locking device comprising a control lever connected to the locking device and rotatable about a fixed axis between a disengaged position thereof in which the locking device is inoperative and an engaged position in which the locking device is operative to effect locking of the differential gear, and a coupling device which connects the rock shaft with the control lever and is operable on rotation of the rock shaft to move the control lever to the engaged position thereof on movement of the lift arm to the working position of an implement carried thereby and to the disengaged position thereof on rocking of the rock shaft to raise the lift arm away from the working position of an implement carried thereby.

8. Mechanism according to claim 7, wherein the coupling device comprises a transfer lever rockable about an axis located between the rock shaft and control lever, a transfer link connecting the transfer lever to the control lever, a cam secured to the rock shaft for rocking movement therewith, an actuating member connected with the transfer lever and co-operating with said cam for lengthwise movement thereby, and a spring acting to urge the actuating member towards the cam.

9. Mechanism according to claim 8, including a bearing carried by the control lever and by which the transfer link is supported for movement lengthwise relative to the control lever, an abutment on the transfer link, and a spring extending between said bearing and abutment to maintain the operative connection between the link and control lever and to permit lengthwise movement of the link relative to the control lever against the action of the spring in the event that the locking device is not in a condition immediately to lock or unlock the differential gear.

10. Mechanism according to claim 8, wherein the control lever comprises a control arm freely mounted on a control shaft, a hand-operable lever secured to the control shaft to effect rocking thereof, and a connecting element operable selectively to couple the control arm to the hand operable lever or to disconnect the hand-operable lever from the control arm.

11. Mechanism according to claim 10, wherein the connecting element comprises a clip pivotally mounted on the control arm.

12. Mechanism according to claim 10, including a bearing carried by the control lever and by which the transfer link is supported for movement lengthwise relative to the control lever, an abutment on the transfer link, and a spring extending between said bearing and abutment to maintain the operative connection between the link and control lever and to permit lengthwise movement of the link relative to the control lever against the action of the spring in the event that the locking device is not in a condition immediately to lock or unlock the differential gear.

References Cited by the Examiner
UNITED STATES PATENTS
2,830,670  4/58  Ferguson _____ 74—710.5 X DON A. WAITE, *Primary Examiner.*